(12) United States Patent
Liao (10) Patent No.: US 9,173,270 B2
(45) Date of Patent: Oct. 27, 2015

(54) LOW-TEMPERATURE LED LIGHTING AND POWER SUPPLY DEVICE

(71) Applicant: Shun-An Liao, New Taipei (TW)

(72) Inventor: Shun-An Liao, New Taipei (TW)

( * ) Notice: Subject to any disclaimer, the term of this patent is extended or adjusted under 35 U.S.C. 154(b) by 207 days.

(21) Appl. No.: 13/936,200

(22) Filed: Jul. 7, 2013

(65) Prior Publication Data

US 2014/0015435 A1    Jan. 16, 2014

(30) Foreign Application Priority Data

Jul. 13, 2012 (TW) .............................. 101213543 U (51) Int. Cl.
*H05B 33/08* (2006.01)

(52) U.S. Cl.
CPC ........ *H05B 33/0884* (2013.01); *H05B 33/0887* (2013.01); *Y02B 20/341* (2013.01)

(58) Field of Classification Search
CPC .................................................... H05B 3/0664
USPC .................................. 315/228, 246, 244, 250
See application file for complete search history.

(56) References Cited

U.S. PATENT DOCUMENTS 5,493,202 A * 2/1996 Iwatani et al. ................. 322/28
8,933,642 B2 * 1/2015 Ghanem ....................... 315/291
2010/0289418 A1 * 11/2010 Langovsky .................... 315/210

* cited by examiner

*Primary Examiner* — Dinh Le (57) ABSTRACT

A low-temperature LED lighting and power supply device has a low power-consuming power supply control module and an LED lighting module electrically connected therewith. The LED lighting module is composed of at least one light source driver and an LED light source. The low power-consuming power supply control module at least has a surge suppression unit, a voltage-dividing-limiting unit, a current-limiting unit, and a steady voltage filtering unit. Accordingly, the present invention allows LED lighting equipment to be applied in a wider power supply range and operated under a low-temperature and low power-consuming state so as to meet economic and practical demands and environmental protection.

16 Claims, 11 Drawing Sheets

420cm(L) X 60cm(W)
AREA LUMINANCE OF AN LED MATRIX LIGHT

LOW-TEMPERATURE LED LIGHTING AND POWER SUPPLY DEVICE

BACKGROUND OF THE INVENTION

1. Field of the Invention

The present invention relates to a low-temperature LED lighting and power supply device and, more particularly, to a power supply control module with low power consumption and an LED lighting module electrically connected with the power control module for LED lighting equipment so as to be adaptable to a wide range of power supply and to be operated under a low-temperature and low power-consuming state in compliance with the demands for economical and practical use and environmental protection.

2. Description of the Related Art

Lamps are indispensable lighting equipment in modern life. For the sake of technological advancement and maturity, new-generation LED lamps are advantageous in high luminance, fast response time, compact size, low power consumption, energy conservation, operational safety, and long life duration. As a result, LED lighting has become the mainstream of lighting developed by the lighting industry to take the place of traditional lighting.

However, only 15~20% of the input power of high-power LEDs is used for lighting, and the remaining 80~85% of the input power is converted into heat. If not effectively dissipated, the heat results in high LED die junction temperature and leads to issues, such as lower lighting efficiency, shorter life cycle, and the like, being key concerns to the quality of LED lighting products.

Traditional LED lighting equipment usually adopts 12V or 30V DC electronic ballast to convert 100V-260V AC power into 12V/300-500 mA or 30V/300-500 mA DC power, which is ideal to LED's light generation. During operation, traditional LED lighting equipment not only becomes a heat source at 60° C. or above but also generates dazzling glare. Due to the requirements of AC input power at no less than 10 mA and pursuit for operation under low temperature, low power consumption, and low carbon emission for environmental protection, conventional lighting equipment still needs improvement in many technical aspects. Besides, the electronic ballast has a plenty of active components therein, which are vulnerable to surge interference and fault-prone accordingly.

As to the solutions for the foregoing high-temperature issue of traditional LED lighting equipment, latest advanced techniques disclosed by the patents, namely, Taiwan Utility Model Patent No. M420646 entitled "Heat-dissipating LED lighting device", Taiwan Utility Model Patent No. M423204 entitled "heat-dissipating LED lamp", Taiwan Patent No. 263008 entitled "LED lamp", Taiwan Patent No. 359243 entitled "LED lamp with heat-dissipating effect", China Patent Application No. 200680019064 entitled "Heat sink for a lamp and method making the same", China Patent Application No. 200810067522 entitled "LED lamp", China Patent Application No. 201010125449 entitled "LED street light", U.S. Pat. No. 7,497,596 B2 entitled "LED and LED lamp", U.S. Pat. No. 8,076,856 B2 entitled "LED lamp", Japan Patent Publication No. 2010050472A entitled "LED and traffic light", Japan Patent Publication No. 2004288827 entitled "LED lamp", and the like, basically drop temperature with choices of materials. Although those structural designs can partially attain heat-dissipating effect, the high temperature issue generated by LED upon lighting actually fails to be fully overcome. Heat dissipation of single LED bulb is already difficult to tackle, let alone LED light sources arranged in the form of a matrix. The temperature arising from accumulated heat could be even higher, and the escalated post-processing cost does not match up to the economic effect delivered by the LED lighting equipment.

Additionally, as the AC voltage of power used by current LED lighting equipment is limited below a range of 100V-260V, the effective range of working voltage is therefore rather limited. Such drawback hinders LED lighting equipment from being combined with solar or wind power generation as a lighting system with an independent power supply.

SUMMARY OF THE INVENTION

In view of the drawbacks of traditional LED lighting equipment, the objective of the present invention is to provide a low-temperature LED lighting and power supply device.

To achieve the foregoing objective, the low-temperature LED lighting and power supply device has a low power-consuming power supply control module and an LED lighting module electrically connected therewith. The LED lighting module is composed of at least one light source driver and an LED light source. The low power-consuming power supply control module at least has a surge suppression unit, a voltage-dividing-limiting unit, a current-limiting unit, and a steady voltage filtering unit. Accordingly, the present invention allows LED lighting equipment to be applied in a wider power supply range and operated under a low-temperature and low power-consuming state so as to meet economic and practical demands and requirements of environmental protection.

DETAILED DESCRIPTION OF THE INVENTION

To allow the examiner to quickly and easily comprehend the characteristics and advantages of the present invention and shed the light on the achieved effect and benefit, the present invention in collaboration with the drawings depicts the characteristics and advantages of the present invention in a detailed manner. Instead of narrowing and limiting the invention scope, the following embodiments are dedicated to in-depth understanding concerning the design concepts of the present invention.

Figure 1:
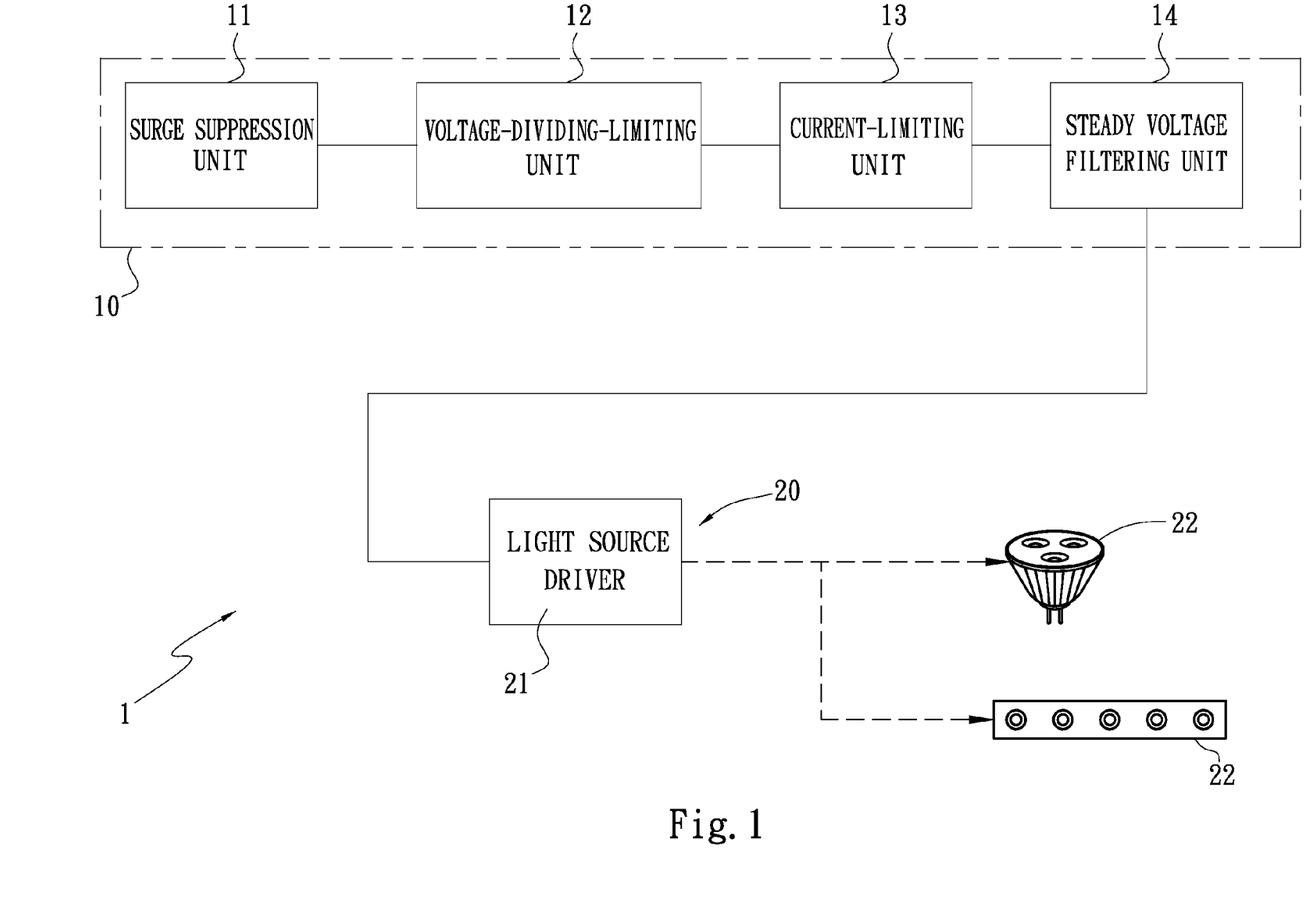
FIG. 1 is a functional block diagram of a low-temperature LED lighting and power supply device in accordance with the present invention.
Figure 2:
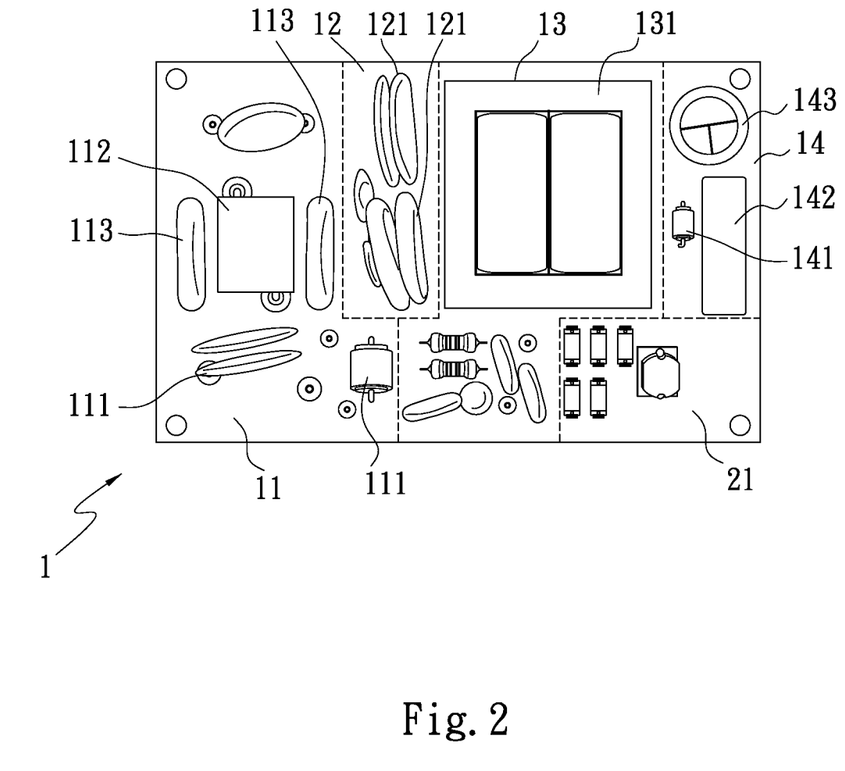
FIG. 2 is a layout diagram of circuit components of the low-temperature LED lighting and power supply device in FIG. 1.
Figure 3:
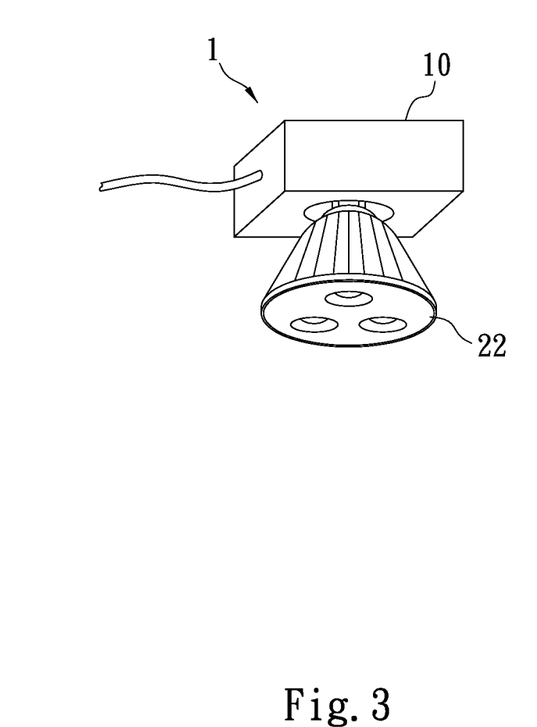
FIG. 3 is a perspective view of an assembled standalone product of the low-temperature LED lighting and power supply device in accordance with the present invention.

With reference to FIGS. 1 to 3, a low-temperature LED lighting and power supply device 1 has a low power-consuming power supply control module 10 and an LED lighting module 20 electrically connected to each other. The low power-consuming power supply control module 10 at least has a surge suppression unit 11, a voltage-dividing-limiting unit 12, a current-limiting unit 13, and a steady voltage filtering unit 14. The LED lighting module 20 has a light source driver 21 and an LED light source 22.

The surge suppression unit 11 is connected to an externally-inputted voltage, and has at least one surge protection element 111, an inductor 112, and at least one capacitor 113, and serves to suppress power surge and convert energy of the power surge into voltage. Accordingly, the switching surge occurring upon switching large-capacity circuit breaker will be effectively suppressed when the low-temperature LED lighting and power supply device is applied to industrial lighting, commercial lighting, and street lights, and the low-temperature LED lighting and power supply device 1 is operated normally under an environment with continuous arc or spark interference.

Figure 4:
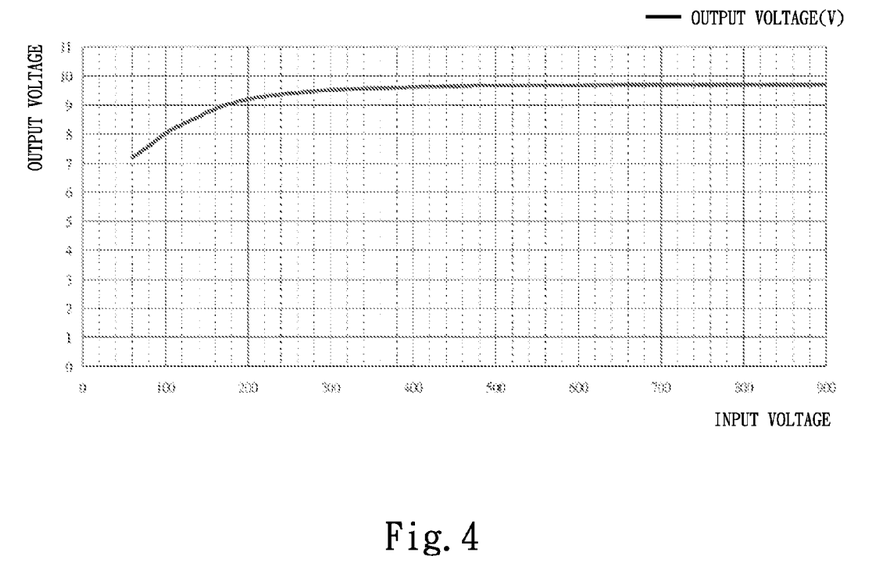
FIG. 4 is a graph associated with input voltage and output voltage of the low-temperature LED lighting and power supply device in FIG. 1.

The voltage-dividing-limiting unit 12 is electrically connected to the surge suppression unit 11, and is composed of two groups of capacitors 121 to widen an AC input voltage range. During implementation, the AC input voltage range can be specially designed, as shown in FIG. 4, in an exponential pattern to be applicable in a range of 60V to 900V, and the output voltage is limited within a specific range to ensure a wider power supply range in applications. If taking the form of three-phase power, such as 380V, 420V, 480V, and the like, the input voltage can be provided through the connection with the L-N lines of an AC power source.

The current-limiting unit 13 is electrically connected to the voltage-dividing-limiting unit 12, and has a transformer 131 in collaboration with the voltage-dividing-limiting unit 12 to limit an input current around 10 mA, which is a regular leakage current range, to achieve a low power-consuming function.

The steady voltage filtering unit 14 is electrically connected to the current-limiting unit 13, has a surge protection element 141, an inductor 142, and a capacitor 143, and filters remaining energy of the power surge to protect a light source driver 21 of the post-stage LED lighting module 20.

The light source driver 21 is electrically connected to an LED light source 22, and is combined with the pre-stage low power-consuming power supply control module 10 to lower heat generated by the LED light source 22 and position the connected LED light source 22 at a low-temperature state.

With further reference to FIG. 3, a standalone product is formed by the low power-consuming power supply control module 10 combined with the LED lighting module 20, and has been mass-produced for the sake of its technical maturity. The standalone product has a fast response time. After an AC power is inputted, the LED light source 22 is fully lighted with a response time in about 6 to 7 μSec without generating any blinking effect to the eyes. Despite round and rectangular LED light source 22 illustrated, the standalone product can be implemented to have various shapes including but not limited to the illustrated shape to suit for different requirements.

Figure 5:
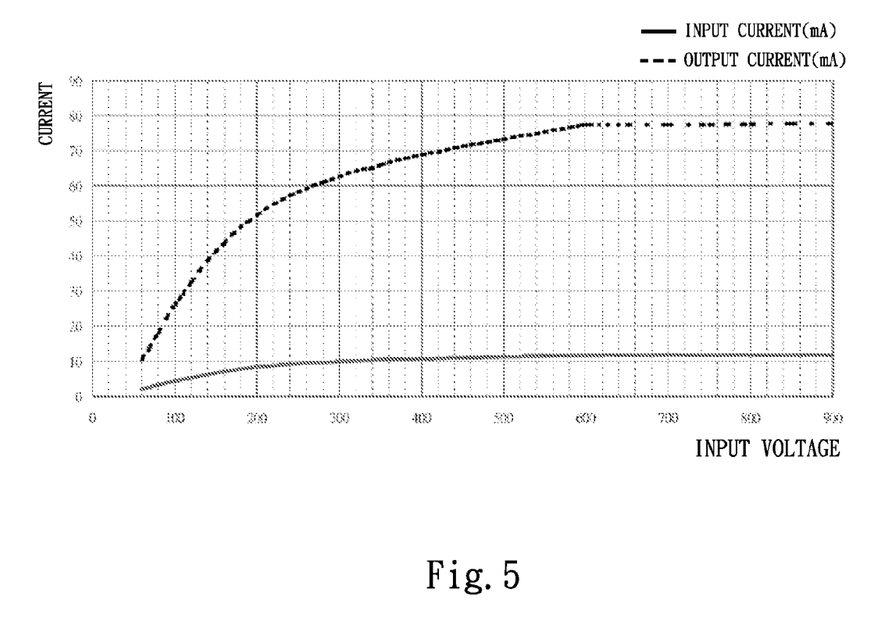
FIG. 5 is a graph associated with voltage and current of the low-temperature LED lighting and power supply device in FIG. 1.
Figure 6:
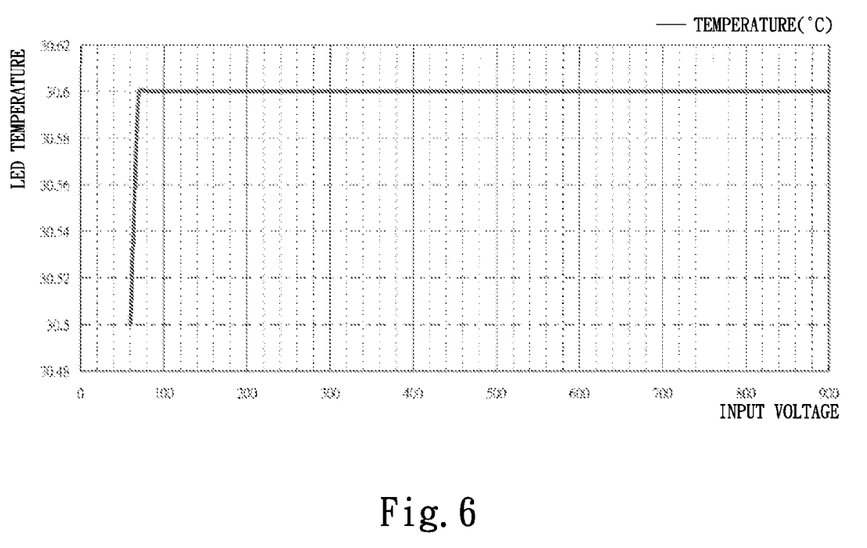
FIG. 6 is a graph associated with input voltage and temperature of the low-temperature LED lighting and power supply device in FIG. 1.

With reference to FIGS. 4 to 6, test data of experiments relevant to the standalone product in FIG. 3 is shown. As indicated in FIG. 4, the allowable AC input voltage ranges from 60 V to 900 V, and the output voltage is kept around 9.5 V. As indicated by FIG. 5, the consumed AC input current is approximately 10 mA, and the optimal input current can be limited around 10 mA±10%, which is below the leakage current of regular electric equipment, and the output current is below 80 mA. With reference to FIG. 6, although an overall temperature of the present invention is maintained at 30° C., the optimal temperature can be limited around 30° C.±10%, which indeed matches the name of a low-temperature lighting device. From FIGS. 4 to 6, the present invention is proven to meet the low-temperature, low power-consuming, and low-carbon demands for environmental protection, breaks through critical technical carrier in the lighting field, and is believed to be creative, novel and innovative.

What worth mentioning is that the exponential voltage-dividing-limiting unit as shown in FIGS. 1 and 5 limits an input load current around 10 mA when the AC input voltage ranges from 60 V to 900 V. Hence, the low power-consuming power supply control module 10 of a standalone product exhibits a low-temperature state. Moreover, as shown in FIGS. 1, 5 and 6, because the output current of the low power-consuming power supply control module 10 is limited below 80 mA (much lower than 100 mA), the temperature of the LED lighting module 20 can be controlled around 30° C. Since the low power-consuming power supply control module 10 and the LED lighting module 20 are all controllably operated under a low-temperature condition, the operating temperature of the standalone product formed by the low power-consuming power supply control module 10 and the LED lighting module 20 can be lower than normal temperature of human body.

Figure 7:
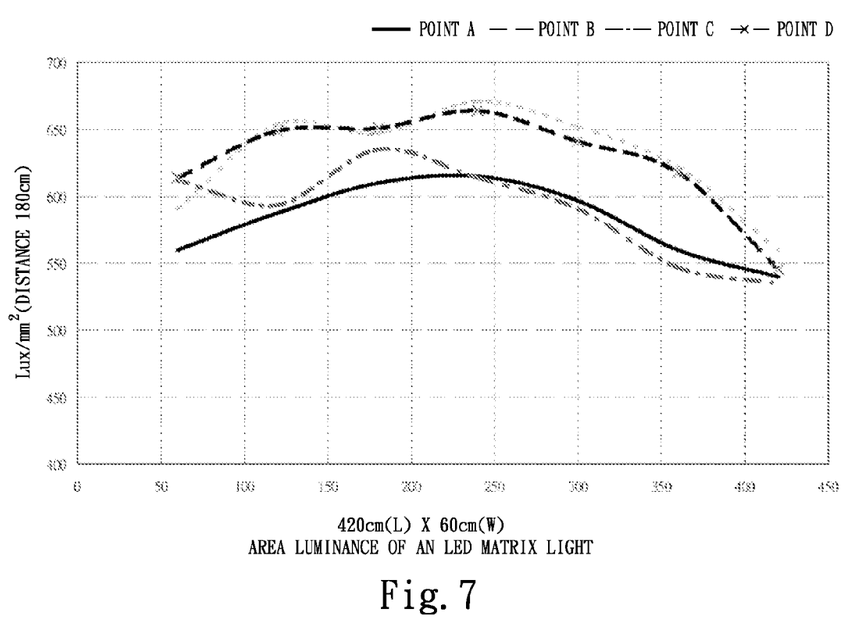
FIG. 7 is a graph associated with area luminance of an LED matrix light using the low-temperature LED lighting and power supply device in FIG. 1.
Figure 8:
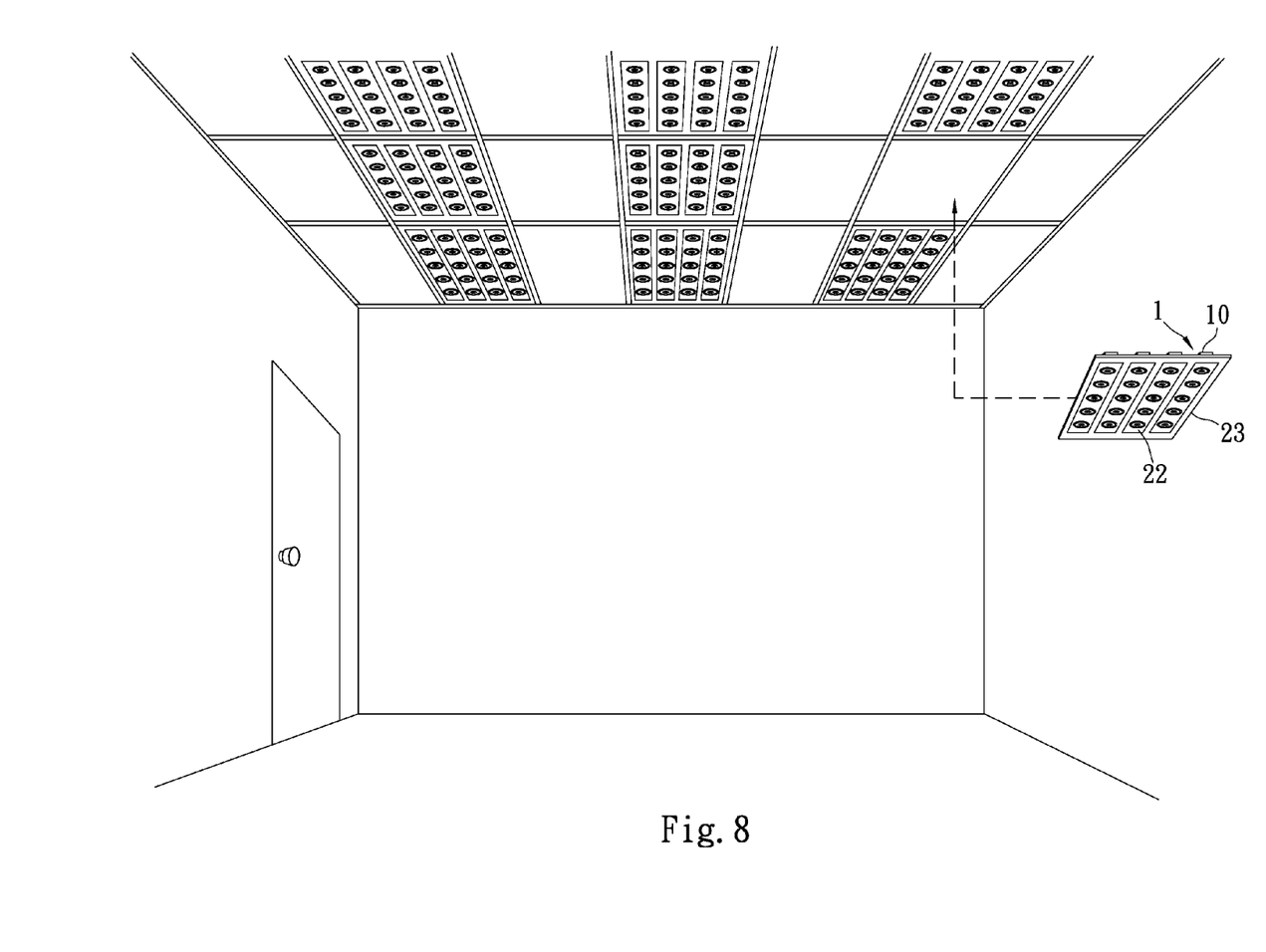
FIG. 8 is a perspective view showing an application of the LED matrix light using the low-temperature LED lighting and power supply device in FIG. 1.
Figure 9:
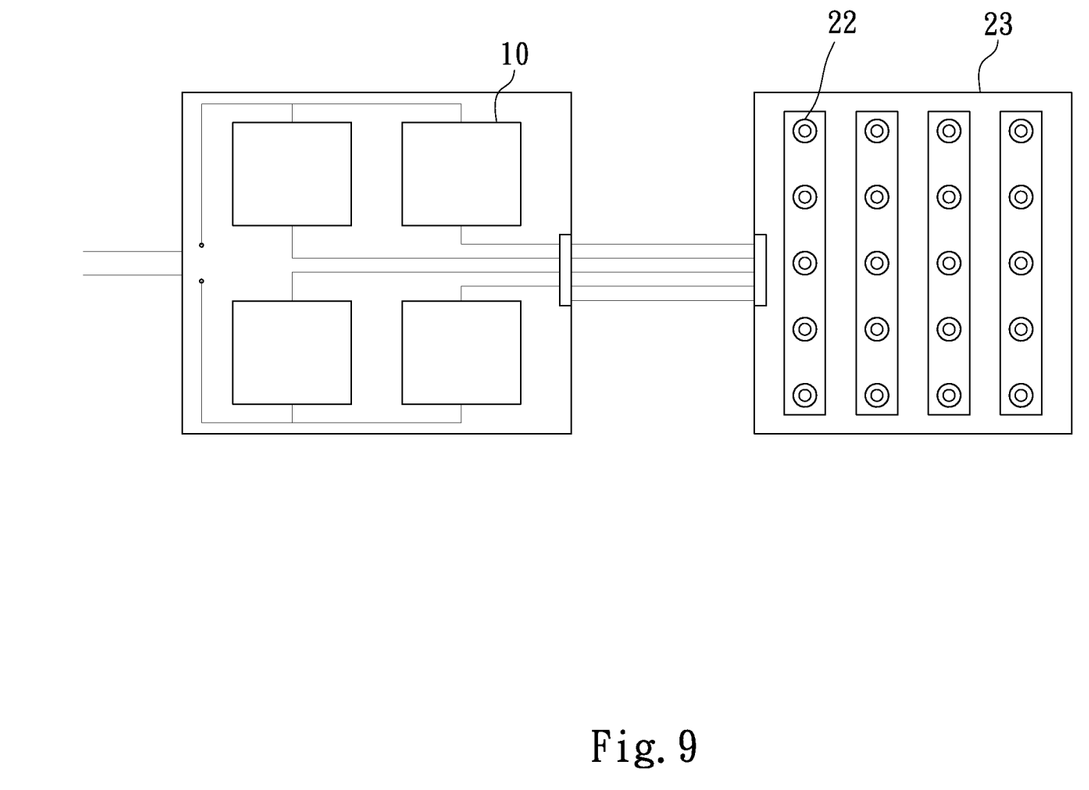
FIG. 9 is a schematic view of the LED matrix light in FIG. 8 made by a low power-consuming power supply control module connected with an LED lighting module.

With reference to FIGS. 1 and 8, when the present invention is practically applied, multiple standalone products formed by electrically connecting multiple low power-consuming power supply control modules 10 and multiple LED lighting modules 20, are arranged in the form of an LED light source matrix 23. With reference to FIG. 9, alternatively, multiple low power-consuming power supply control module 10 and multiple LED lighting modules 20 are respectively mounted on two separate circuit boards with a ribbon cable connected between the circuit boards in formation of an LED light source matrix 23. Either one of the two applications for LED light source matrix can be normally operated under a low-temperature state. These applications are technically mature and can be distributed and sold to customers at the current stage. Although the foregoing description only discloses that the LED light source matrix 23 in the applications are made by rectangular LED light sources 22, actual layout and arrangement of the LED light source matrix 23 are not limited to be the same. Empirical data of each standalone product of the LED light source matrix 23 is the same as mentioned and is therefore not repeated here. With reference to FIG. 7, empirical data of overall operating luminance is shown. When the overall luminance of the LED light source matrix 23 is uniformly distributed on an area with a size of 420 cm×60 cm and is measured at a height of 180 cm, an optimal luminance is 680 Lux/mm² occurring at a center position of the area, and a minimum luminance is 480 Lux/mm² occurring along a border of the area.

When being implemented, the present invention has the following advantages.

1. The low-temperature LED lighting and power supply device 1 only consumes current for just a few mA, and the temperature thereof is also significantly lower than that of traditional LED lighting. As a result, the temperature rise of the ambient environment is relatively small and the air-conditioning is less likely required to cool the ambient environment, thereby significantly reducing power usage. As to the reduction of carbon emission, the present invention overwhelms the LED lighting in the current market, truly attains the goal of environmental protection, such as heat control, energy conservation, and carbon reduction, and is a significant breakthrough of the lighting field.

Figure 10:
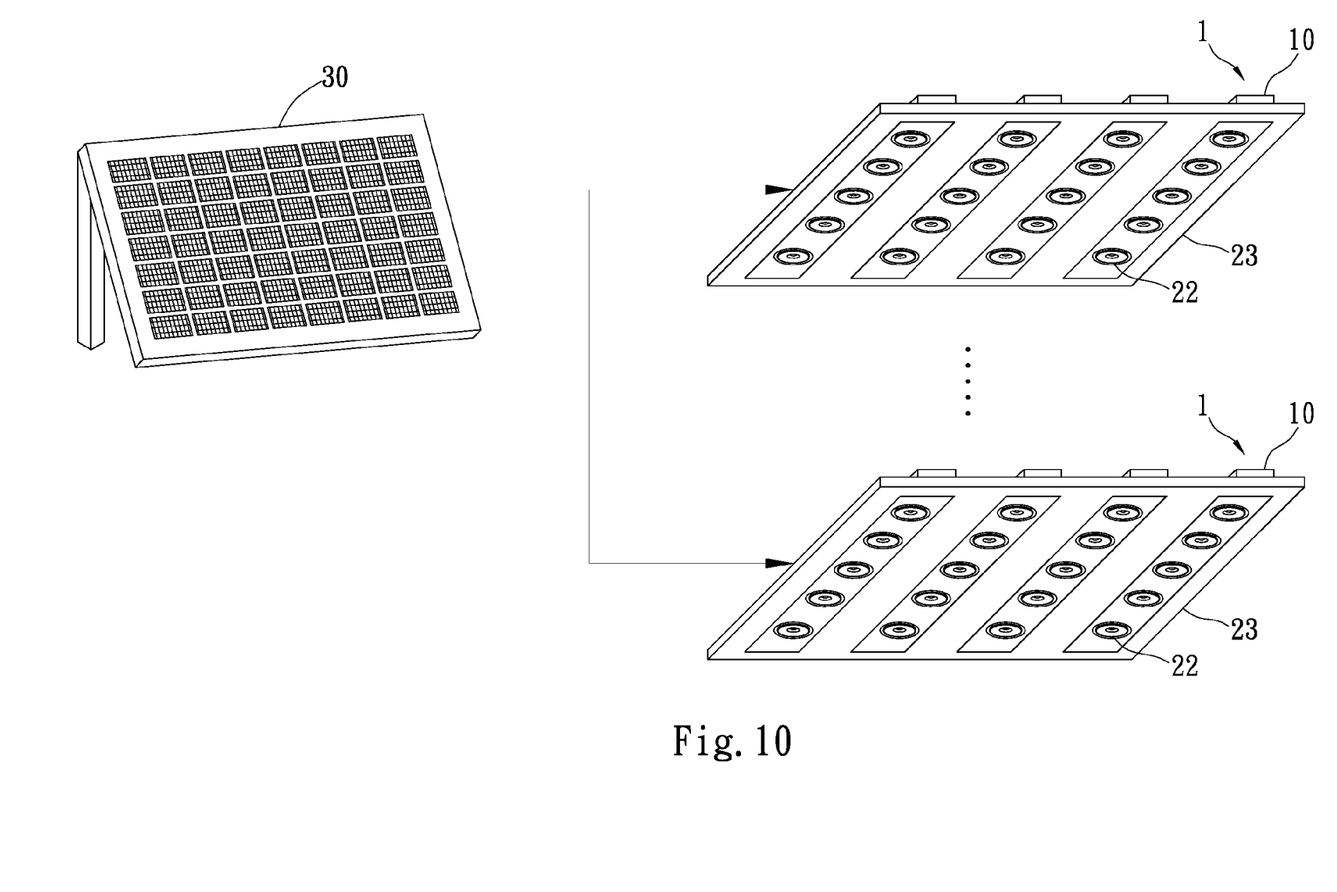
FIG. 10 is a schematic view of multiple LED matrix lights in FIG. 9 connected to a solar power supply.
Figure 11:
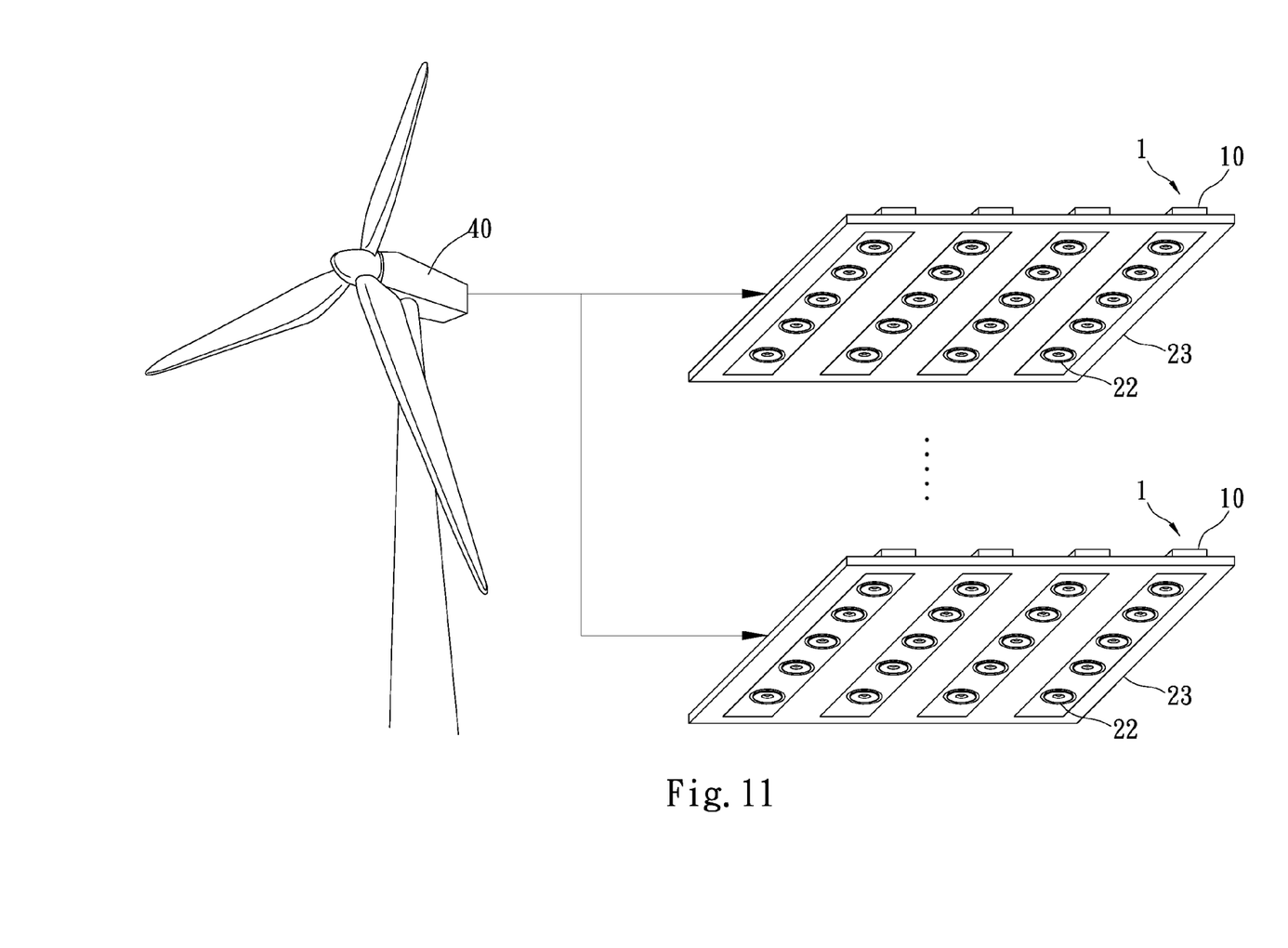
FIG. 11 is a schematic view of multiple LED matrix lights in FIG. 9 connected to a wind power supply.
Figure 12:
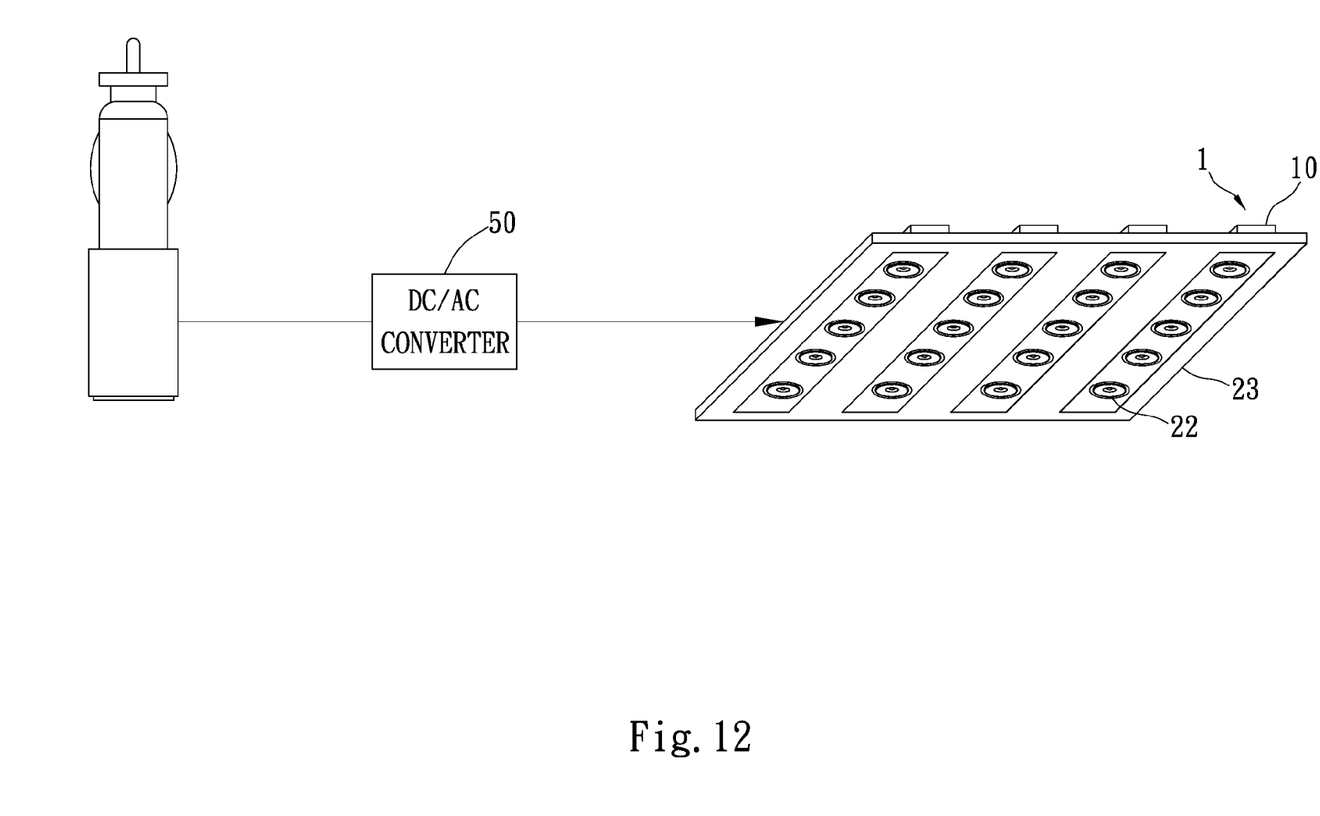
FIG. 12 is a schematic view of an LED matrix light in FIG. 9 connected to a vehicular power supply.

2. The present invention is specially planned and designed for the operating AC voltage thereof falls in a range of 60 V to 900 V. Besides the compatibility in terms of the use with regular power supply system, the present invention can be directly connected with solar power supply equipment 30 as shown in FIG. 10, wind power generation equipment 40 as shown in FIG. 11, a vehicular DC to AC device 50 being a handheld power supply for lighting equipment as shown in FIG. 12, and the like.

Figure 13:
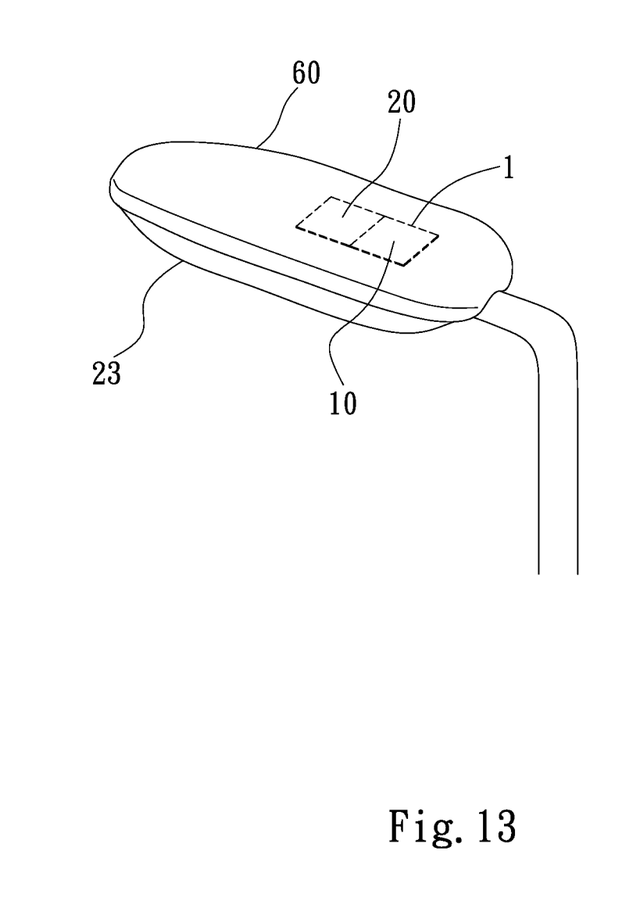
FIG. 13 is a schematic view of a street light using the low-temperature LED lighting and power supply device in FIG. 1.

3. The light source of the present invention can be distributed in the form ranging from single point to a plane. Among all the forms, the LED sources in a matrix form deliver very uniform luminance and are effective for the operation of industrial lighting, commercial lighting, agricultural lighting, aesthetic lighting, household lighting and street lighting 60 as shown in FIG. 13.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A low-temperature LED lighting and power supply device, comprising:
   an LED lighting module having:
      a light source driver; and
      an LED light source electrically connected to the light source driver; and
   a power supply control module electrically connected to the LED lighting module and having:
      a surge suppression unit adapted to connect to an AC input voltage, suppressing a power surge and convert energy of the power surge into voltage;
      a voltage-dividing-limiting unit electrically connected to the surge suppression unit, configured to accept a range of AC input voltages, and limiting a range of an output voltage for the LED lighting module;
      a current-limiting unit electrically connected to a voltage-dividing-limiting unit, limiting an input current; and
   a steady voltage filtering unit electrically connected to the current-limiting unit, and filtering energy of the power surge from the surge suppression unit to protect the LED lighting;
      wherein the voltage-dividing-limiting unit is an exponential voltage-dividing-limiting unit, and limits an input load current in a range of 10 mA±10% when the AC input voltage ranges from 60 V to 900 V.

2. The low-temperature LED lighting and power supply device as claimed in claim 1, wherein the AC input voltage takes the form of three-phase power with one of voltages of 380V, 420V, 480V, and is provided by connecting with L-N lines of an AC power source.

3. The low-temperature LED lighting and power supply device as claimed in claim 1, wherein an output current of the power supply control module is limited in a range from 80 mA to 100 mA, and a temperature of the LED lighting module is controlled in a range of 30° C.±10%.

4. The low-temperature LED lighting and power supply device as claimed in claim 3, wherein
   the surge suppression unit has at least one surge protection element, an inductor, and at least one capacitor;
   the voltage-dividing-limiting unit includes a plurality of capacitors;
   the current-limiting unit has at least a transformer in collaboration with the voltage-dividing-limiting unit; and
   the steady voltage filtering unit has at least a surge protection element, an inductor, and a capacitor.

5. The low-temperature LED lighting and power supply device as claimed in claim 4, wherein the LED light source is fully lighted with a response time from 6 to 7 μsec.

6. The low-temperature LED lighting and power supply device as claimed in claim 4, wherein the device is electrically connected with solar power generation equipment to form an independent lighting system.

7. The low-temperature LED lighting and power supply device as claimed in claim 4, wherein the device is electrically connected with wind power generation equipment to form an independent lighting system.

8. The low-temperature LED lighting and power supply device as claimed in claim 4, wherein the device is electrically connected with a vehicular DC to AC device to form a handheld light.

9. A low-temperature LED lighting and power supply device, comprising multiple LED lighting modules and multiple power supply control modules to form an LED light source matrix, wherein
   each LED lighting module has:
      a light source driver; and
      an LED light source electrically connected to the light source driver; and
   each low power-consuming power supply control module is electrically connected to the LED lighting module and has:
      a surge suppression unit adapted to connect to an AC input voltage, suppressing a power surge and convert energy of the power surge into voltage;
      a voltage-dividing-limiting unit electrically connected to the surge suppression unit, configured to accept a range of AC input voltages, and limiting a range of an output voltage for the LED lighting module;
      a current-limiting unit electrically connected to a voltage-dividing-limiting unit, limiting an input current; and
   a steady voltage filtering unit electrically connected to the current-limiting unit, and filtering energy of the power surge from the surge suppression unit to protect the LED lighting module;
      wherein the voltage-dividing-limiting unit is an exponential voltage-dividing-limiting unit, and limits an input load current in a range of 10 mA±10% when the AC input voltage ranges from 60 V to 900 V.

10. The low-temperature LED lighting and power supply device as claimed in claim 9, wherein the AC input voltage takes the form of three-phase power with one of voltages of 380V, 420V, 480V, and is provided by connecting with L-N lines of an AC power source.

11. The low-temperature LED lighting and power supply device as claimed in claim 9, wherein an output current of the power supply control module is limited in a range from 80 mA to 100 mA, and a temperature of the LED lighting module is controlled in a range of 30° C.±10%.

12. The low-temperature LED lighting and power supply device as claimed in claim 11, wherein
the surge suppression unit has at least one surge protection element, an inductor, and at least one capacitor;
the voltage-dividing-limiting unit includes a plurality of capacitors;
the current-limiting unit has at least a transformer in collaboration with the voltage-dividing-limiting unit; and
the steady voltage filtering unit has at least a surge protection element, an inductor, and a capacitor.

13. The low-temperature LED lighting and power supply device as claimed in claim 12, wherein the LED light source matrix is fully lighted with a response time from 6 to 7 μsec.

14. The low-temperature LED lighting and power supply device as claimed in claim 12, wherein the device is electrically connected with solar power generation equipment to form an independent lighting system.

15. The low-temperature LED lighting and power supply device as claimed in claim 12, wherein the device is electrically connected with wind power generation equipment to form an independent lighting system.

16. The low-temperature LED lighting and power supply device as claimed in claim 12, wherein the device is electrically connected with a vehicular DC to AC device to form a handheld light.

* * * * *